United States Patent [19]

Sanitate

[11] Patent Number: 5,158,732
[45] Date of Patent: Oct. 27, 1992

[54] METHOD OF TEMPERING WORKPIECES OF DUROPLASTIC PLASTIC

[75] Inventor: Franco Sanitate, Koblenz, Fed. Rep. of Germany

[73] Assignee: Lucas Industries public limited company, Birmingham, England

[21] Appl. No.: 705,525

[22] Filed: May 24, 1991

[30] Foreign Application Priority Data

Jun. 6, 1990 [DE] Fed. Rep. of Germany ....... 4018114

[51] Int. Cl.$^5$ ........................ B29C 35/02; B29C 71/02
[52] U.S. Cl. .................................... 264/235; 264/236; 264/347; 264/331.22; 264/346
[58] Field of Search ............... 264/345, 347, 101, 346, 264/235, 236, 331.22

[56] References Cited

U.S. PATENT DOCUMENTS

| | | | |
|---|---|---|---|
| 2,037,375 | 4/1936 | Freeman | 264/346 |
| 2,337,903 | 12/1943 | Lauck | 264/346 |
| 2,641,801 | 6/1953 | Batchelor et al. | 264/347 |
| 2,913,770 | 11/1959 | Beno | 264/347 |
| 3,029,473 | 4/1962 | Greenberg | 264/101 |

FOREIGN PATENT DOCUMENTS 2902083 8/1979 Fed. Rep. of Germany.

OTHER PUBLICATIONS

Postbaking Phenolic Parts, SPE Journal, Dec. 1968, vol. 24, Jost et al.

Primary Examiner—Jeffery Thurlow
Attorney, Agent, or Firm—Oblon, Spivak, McClelland, Maier & Neustadt

[57] ABSTRACT

Method of tempering workpieces of duroplastic plastic, in particular a piston for a motor vheicle brake, provides that the workpiece is heated after the pressing or molding according to a predetermined time-dependent temperature rise for several hours and after an initial heating phase a difference from the respective glass transition temperature of 5° to 40° C. is observed.

3 Claims, 2 Drawing Sheets

METHOD OF TEMPERING WORKPIECES OF DUROPLASTIC PLASTIC

FIELD OF THE INVENTION

The invention relates to a method of tempering workpieces of a duroplastic plastic.

BACKGROUND OF THE INVENTION

The objective of the invention is to improve the heat stability, (i.e. the heat resistance) of said workpieces.

It is known to use plastic parts, in particular plastic pistons, in motor vehicle brakes. This has in particular the advantage that due to the poor thermal conductivity by the plastic the heat generated in the brake linings on braking is transmitted to the brake fluid to a reduced extent. Heating of brake fluid is extremely undesirable in braking systems because the bubble formation occurring on heating in the brake fluid can considerably impair the braking effect.

If workpieces of a duroplast are heated to the so-called glass transition temperature this may result, in particular on very rapid heating, in an explosion-like liberation of gases in the plastic with a consequent impairing of the stability of the material, in particular by crack formation or the like.

BRIEF DESCRIPTION OF THE INVENTION

To improve the heat resistance of the aforementioned workpieces of duroplastic plastic the invention provides that the workpiece after pressing or molding is heated in accordance with a predetermined time-dependent temperature rise for several hours and after an initial heating phase a difference from the respective glass transition temperature of 5° to 40° C. is maintained.

At the socalled glass transition temperature high-polymer substances change to a vitreous rigid state. When tempering a molding of a duroplastic material this glass transition temperature (also called glass transformation temperature) is a function of the particular temperature, i.e. with increasing temperature during the tempering of duroplastic materials changes take place in the material due to which the glass transition temperature thereof rises.

The invention therefore provides a tempering of the workpiece with temperature rising over several hours; firstly, in a relatively short phase of less than two hours heating of the workpiece is carried out with relatively steep temperature gradient to a temperature which lies a predetermined difference beneath the glass transition temperature. For example, the difference may be 5° to 40° C., preferably 10° to 30° C., in particular about 20° C. After this initial heating phase the workpiece is heated either in stages or continuously for more than 10 hours, a predetermined difference from the respective glass transformation temperature being observed. In the course of this tempering the difference from the glass transformation temperature may become increasingly greater.

DISCUSSION OF PRIOR ART

DE 39 05 412 A1 describes a method of improving the heat resistance of shaped bodies or moldings of thermoplastic materials in which the shaped body after the thermoplastic processing is subjected for some hours to a thermal aftertreatment. This publication does not discuss duroplastic materials.

DE 37 29 082 A1 describes a thermal treatment of thermoplastic materials and reaches the conclusion that the heat resistance increases with the duration of the tempering. Stepped temperings (or also temperings with rising temperature gradients) are said to be not as effective as regards the heat resistance as a tempering at the highest temperature stage for the entire tempering time.

DE 38 11 810 A1 describes an afterheating of workpieces of duroplasts for a number of seconds.

DE-29 02 083 B2 describes a method of tempering a workpiece of a duroplastic plastic in which the critical temperature is exceeded.

The present invention is based on the surprising recognition that with a temperature program according to the invention for the tempering on the one hand very high glass transition temperatures of the material can be achieved and on the other the heat resistance can be considerably improved. With the method according to the invention glass transition temperatures of more than 300° C. can be achieved, both for single-stage resins and for 2-stage resins. For the two aforementioned duroplast types the invention provides different temperature/time dependences during tempering.

Hereinafter some examples of embodiment of the invention will be described in detail with the aid of the drawings, wherein:

DETAILED DESCRIPTION OF THE INVENTION

Figure 1:
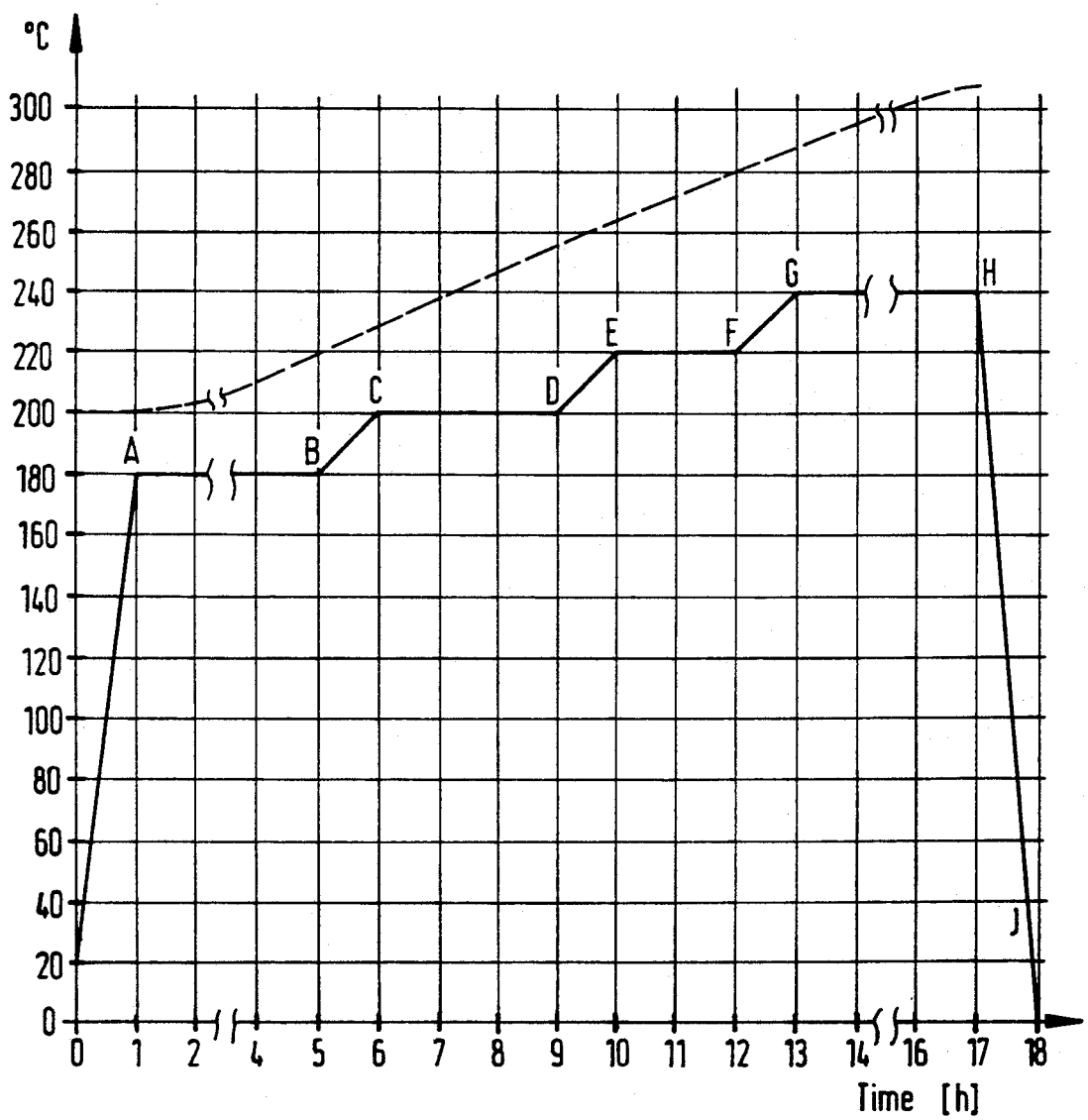
FIG. 1 shows the temperature/time dependence on tempering a piston for a motor vehicle brake consisting of a single-stage resin and FIG. 2 shows the temperature/time dependence on tempering a piston for a motor vehicle brake consisting of a two-stage resin.

In FIG. 1, along the ordinate the temperature in °C. is plotted and along the abscissa the time in hours.

The temperature curves are denoted by the letters A to K in their temperature-dependent and time-dependent variation. In both examples of embodiment according to FIGS. 1 and 2 a stepped increase of the temperature during tempering is provided. Instead of the stepped temperature increase a continuous increase of the temperature can also be effected; the tempering curve would then correspond substantially to the profile of the full line in the Figures but would be a smooth curve.

Plastic pistons for motor vehicle brakes consist in particular of single or two-stage resins.

With a single-stage resin, for example phenol formaldehyde resin, on heating a duroplast is formed with emission of water.

In the case of a two-stage resin, for example phenol resin as basic material, a stable mass is obtained by mixing with hexamethylene tetramine (as crosslinking agent) at a temperature of about 130° C.

On further heating above 130° C. ammonia $NH_3$ is liberated and a duroplast formed.

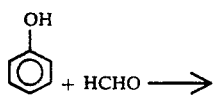

Phenol   Formaldehyde

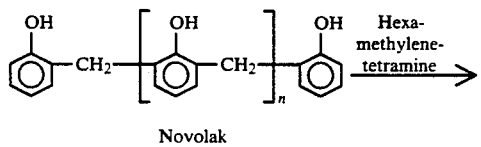

Novolak

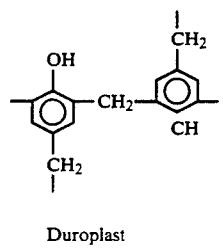

Duroplast

If these duroplasts are heated to the glass transition temperature mentioned gases form in the resin. The initial glass transition temperature is about 200° C. with a single-stage duroplast and about 175° C. with a two-stage duroplast.

Figure 2:
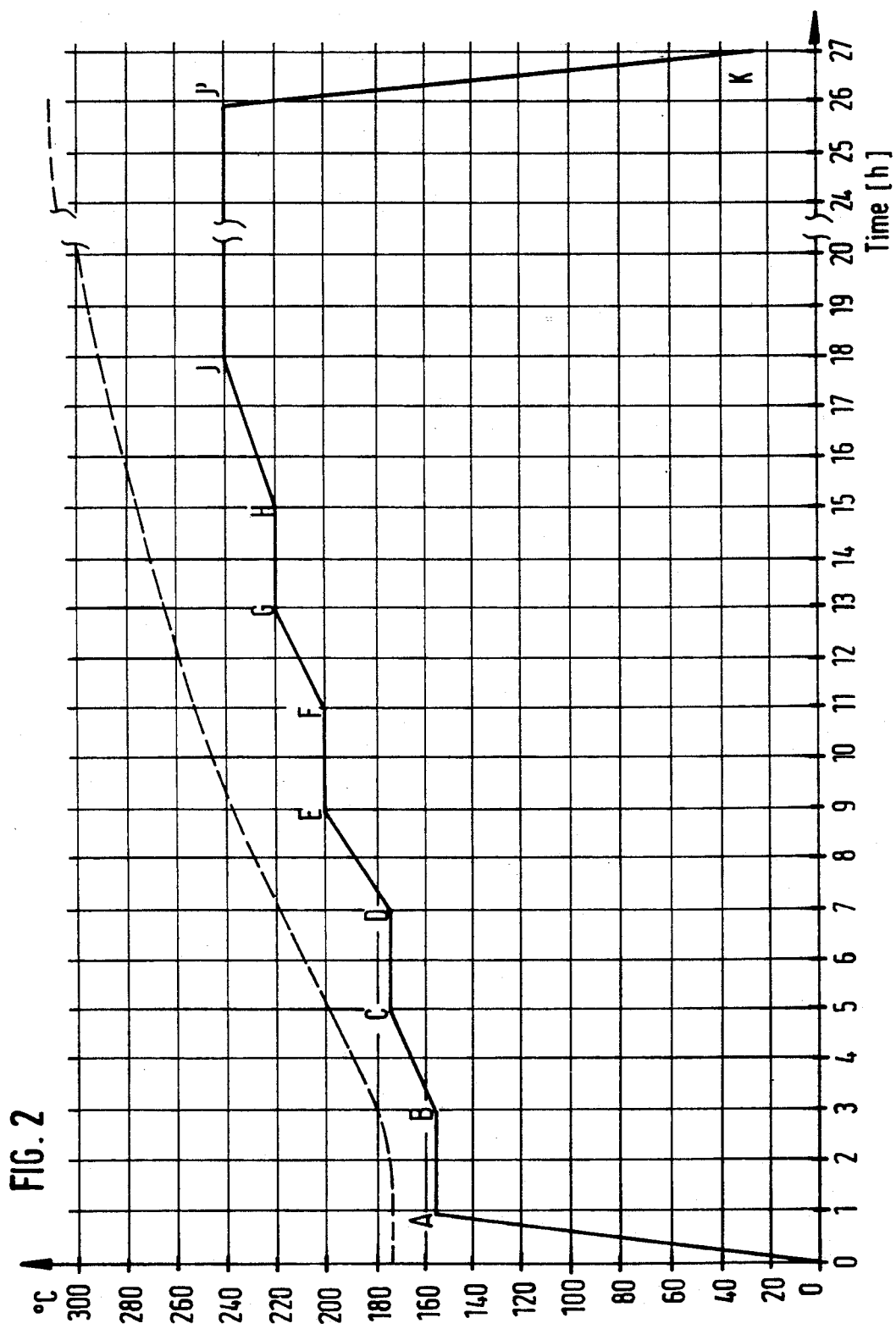

If the tempering is carried out in accordance with the tempering curves shown in FIGS. 1 and 2 it is possible to widen the pores, avoiding explosion-like liberations of gas and allowing the gas to escape without damage.

In accordance with FIG. 1, in the example of embodiment illustrated for tempering a shape body of duroplastic material on the basis of a single-stage resin the workpiece is cured and degased after pressing in several stages at different temperature. After the initial heating phase up to point A, which lies correspondingly in the range from 1 h±50% the tempering temperature has in each case a difference of at least 20° C. from the glass transition temperature (dashed line). Thereafter the temperature rise gradient corresponds to about 20° C. for 2 to 4 h. At the start, i.e. following the heating phase up to the point A, the temperature gradient is flatter than in the following profile of the tempering. With a stepped tempering curve in accordance with FIG. 1 the holding duration at the temperature of 180° C. is longer than at the temperature of 200° C. (between the points C and D of FIG. 1). In this manner the temperature gradient becomes progressively steeper in the course of the tempering for several hours until after about 13 h the point G is reached at which a relatively long curing is again carried out at substantially unchanging temperature (240° C.) to achieve certain degasing of the then only slight residual gas pressure. This also reduces appreciably the compressibility which is increased by the gas pressure arising in the pores.

FIG. 2 shows a temperature curve for a brake piston of a duroplast on the basis of a two-stage resin. Here as well a tempering for a relatively long period has proved favourable. In both cases the cooling after 17 and 26 h respectively to room temperature takes place within a period of about 1 h.

In detail, FIG. 1 shows the following for the tempering of a piston of a single-stage resin:

| | |
|---|---|
| heating to 180° C. | within 1 hour |
| holding at 180° C. | for 4 hours |
| heating to 200° C. | within 1 hour |
| holding at 200° C. | for 3 hours |
| heating to 220° C. | within 1 hour |
| holding at 220° C. | for 2 hours |
| heating to 240° C. | within 1 hour |
| holding at 240° C. | for 4 hours |
| cooling to room temperature | for 1 hour |

In accordance with FIG. 2 the following applies to the tempering of a piston of a two-stage resin:

| | |
|---|---|
| heating to 155° C. | for 1 hour |
| holding at 155° C. | for 2 hours |
| heating to 175° C. | for 2 hours |
| holding at 175° C. | for 2 hours |
| heating to 200° C. | for 2 hours |
| holding at 200° C. | for 2 hours |
| heating to 220° C. | for 2 hours |
| holding at 220° C. | for 2 hours |
| heating to 240° C. | for 3 hours |
| holding at 240° C. | for 8 hours |
| cooling to room temperature | for 1 hour |

The respective temperature rises from step to step are about 20°. The temperature of the material is however always about 20° C. beneath the glass transition temperature.

Preferably, in the centre section of the tempering curve the holding time in the individual steps becomes shorter with increasing time (or correspondingly steeper with a continuous heating of the temperature gradient). This is because with increasing polymerization the gas formation diminishes. It is only towards the end of the tempering operation that once again a longer holding time is provided for the last step (with single-stage resin at 240° C.) to ensure certain degasing at low gas pressure.

Plastic pistons made by the method described above withstand a temperature load of up to 400° C. for 10 min. without damage.

The difference apparent from a comparison of FIGS. 1 and 2 in the optimum profile of the tempering curves between single-stage and two-stage resins is presumably due to the fact that the diffusion resistance for the ammonia molecules $NH_3$ liberated in the two-stage resin through the macromolecules of the duroplast is greater than the diffusion resistance for water molecules in the case of a single-stage resin.

I claim:

1. Method of tempering a workpiece, in particular a piston for a motor vehicle brake, said workpiece being composed of a plastic thermosetting resin material, comprising the steps of:

forming said workpiece, heating said workpiece during an initial heating phase for a predetermined period of time of between 30 and 90 minutes until said workpiece is 5° to 40° C. below its actual glass transition point and thereafter continuing to heat said workpiece over a period of hours in accordance with a predetermined time-dependent temperature rise wherein as the glass transition temperature rises, the temperature of the workpiece is increased such that it remains 5° to 40° C. below the actual glass transition temperature.

2. Method according to claim 1, wherein in the initial heating phase the workpiece is heated up to a temperature of 10° to 30° C. below the glass transition temperature and that thereafter, as the glass transition temperature rises, the temperature is increased such that it stays 10° to 30° C. below the actual glass transition temperature.

3. Method according to claim 1, wherein said resin material is a phenolic resin.

* * * * *